US007918187B2

(12) United States Patent
Bagnall

(10) Patent No.: US 7,918,187 B2
(45) Date of Patent: Apr. 5, 2011

(54) FLOATING AQUATIC STRUCTURE

(75) Inventor: Gary Wayne Bagnall, Arroyo Grande, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 0 days.

(21) Appl. No.: 12/656,081

(22) Filed: Jan. 15, 2010

(65) Prior Publication Data

US 2010/0132621 A1    Jun. 3, 2010

Related U.S. Application Data

(63) Continuation of application No. 11/381,897, filed on May 5, 2006, now abandoned.

(51) Int. Cl.
*A01K 63/00* (2006.01)

(52) U.S. Cl. ......................................................... 119/253

(58) Field of Classification Search .................. 119/253, 119/256; D30/106
See application file for complete search history.

(56) References Cited

U.S. PATENT DOCUMENTS

| 3,327,686 A | 6/1967 | Holden | 119/251 |
| 3,517,649 A | 6/1970 | Holden | 119/253 |
| 4,281,830 A | 8/1981 | Rehbein | 472/127 |
| 4,588,618 A | 5/1986 | Wolfe | 428/7 |
| 4,787,631 A | 11/1988 | Erumsele | 273/445 |
| 4,788,938 A | 12/1988 | Davenport | 119/246 |
| 5,722,347 A | 3/1998 | Tominaga et al. | 119/253 |
| 7,086,349 B2 | 8/2006 | Bagnall | 119/253 |
| 2004/0134405 A1 | 7/2004 | Lekhtman | 114/263 |
| 2005/0145190 A1 | 7/2005 | Bagnall | 119/253 |
| 2006/0185610 A1 | 8/2006 | Canady | 119/253 |

*Primary Examiner* — Kimberly S Smith
(74) *Attorney, Agent, or Firm* — Mitchell Silberberg & Knupp LLP

(57) ABSTRACT

Provided is a floating structure for use in an aquarium or other aquatic setting, having a manufactured hollow body with a top side, a bottom side and sidewalls extending between the top side and the bottom side. The hollow body is weighted so as to have a stable floating position in water such that the hollow elongated body predominantly remains submerged beneath the water's surface, but an outer surface of the top side consistently remains above the surface of the water.

8 Claims, 3 Drawing Sheets

FLOATING AQUATIC STRUCTURE

CROSS-REFERENCE TO RELATED APPLICATION

This application is a continuation of U.S. patent application Ser. No. 11/381,897, filed May 5, 2006, which is now abandoned.

FIELD OF THE INVENTION

The present invention pertains to devices for use within an aquarium or other aquatic setting and is applicable, e.g., to structures for allowing fish, turtles and other aquatic and/or amphibious life to swim through and/or climb upon.

BACKGROUND

A variety of different structures for use within an aquarium exist. Examples include the structures described in commonly assigned patent application Ser. No. 10/752,641, titled "Floating Rail-Guided Aquarium Dock" to the present inventor, which application is incorporated herein by reference as though set forth herein in full. However, additional structures for use within an aquarium are desirable.

SUMMARY OF THE INVENTION

The present invention addresses the need for such additional structures by providing, in one representative embodiment, a floating structure for use in an aquarium or other aquatic setting. The structure has a manufactured hollow elongated body with a top side, a bottom side and sidewalls extending between the top side and the bottom side. The hollow elongated body is weighted so as to have a stable floating position in water such that the hollow elongated body predominantly remains submerged beneath the water's surface, but an outer surface of the top side consistently remains above the surface of the water.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
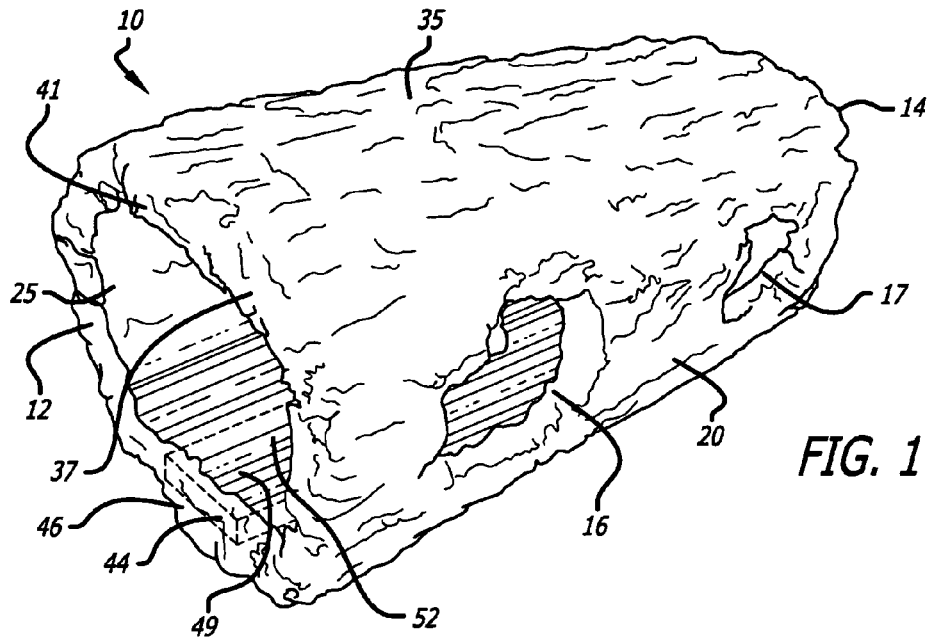
FIG. 1 is a perspective view showing the top side, left sidewall and front opening of a floating structure according to a first representative embodiment of the present invention.
Figure 2:
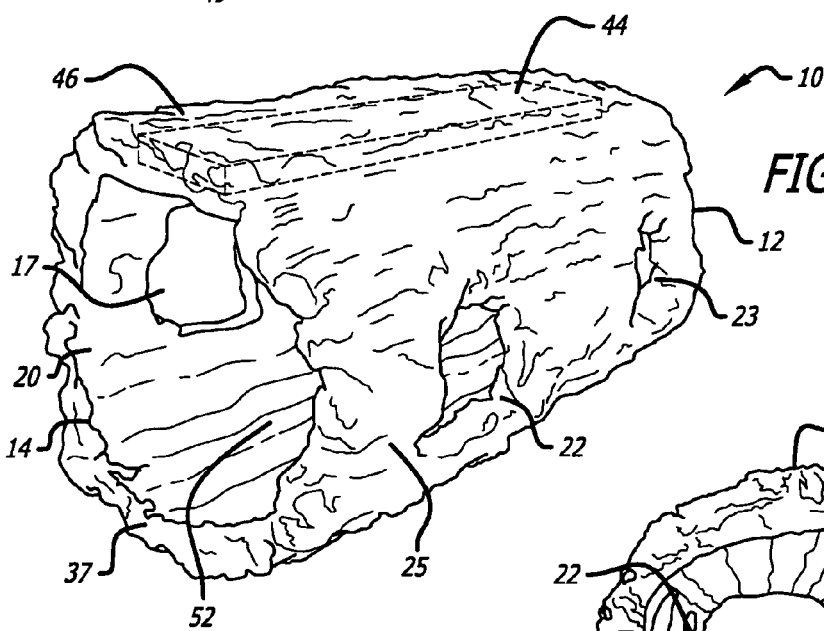
FIG. 2 is a perspective view showing the bottom side, right sidewall and rear opening of the floating structure according to the first representative embodiment of the present invention.
Figure 3:
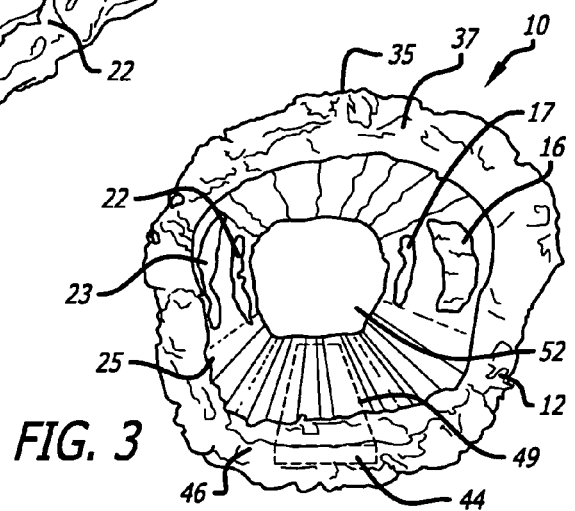
FIG. 3 is a perspective view of the interior of the floating structure, as observed from its front opening, according to the first representative embodiment of the present invention.

FIGS. 1-4 illustrate a floating structure 10 for use within an aquarium or other aquatic setting according to a first representative embodiment of the present invention. As used herein, the term "aquarium" is intended to mean a container (such as a glass tank) in which living aquatic (which can include amphibious) animals or plants are kept. As such, the term aquarium, as used herein, encompasses certain terrariums, i.e., those that that are partially or entirely aquatic, and palladariums.

As shown in FIGS. 1-4, in the present embodiment of the invention structure 10 is configured so as to replicate a hollowed-out log. More specifically, the outer surface of structure 10 preferably is manufactured so as to have texture and color that are very similar to those of natural tree bark. However, structure 10 instead could be configured with any other structure, although in the preferred embodiments it is manufactured so as to replicate some naturally occurring structure, e.g., in order to more faithfully reproduce the animals' natural environment and to enhance the overall visual aesthetic for the owner of an aquarium or other aquatic setting.

In any event, structure 10 preferably is hollow and elongated, with one or more openings for fish and other aquatic (e.g., amphibious) animals to swim through. In the present embodiment, both of the front end 12 and rear end 14 are open, thereby allowing such animals to swim through from end to end. In addition, two holes 16 and 17 are provided in left sidewall 20 and two holes 22 and 23 are provided in right sidewall 25. However, as discussed below, the actual numbers of holes provided in sidewalls 20 and 25, as well as their sizes, preferably depend upon the overall size of the structure 10.

Figure 4:
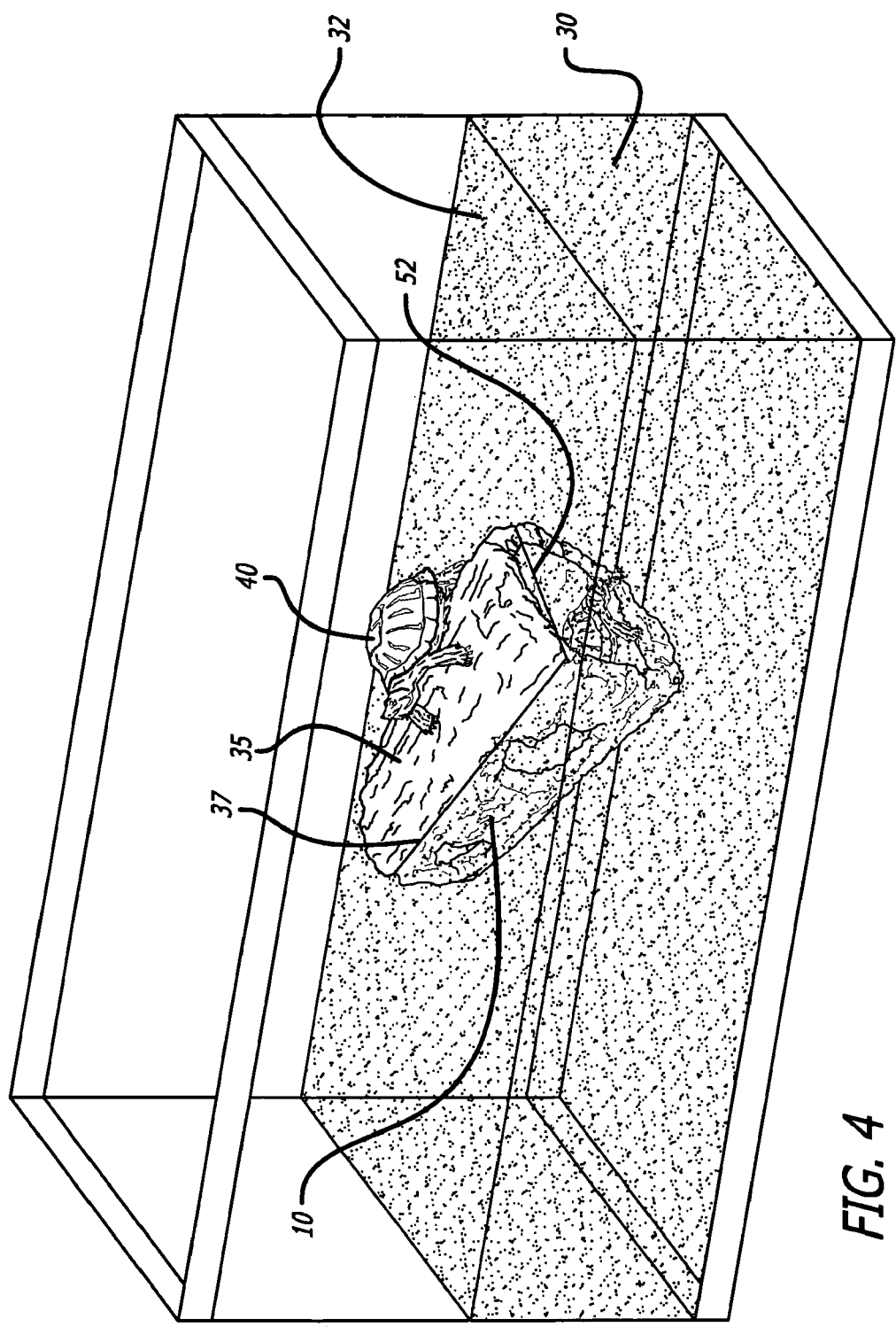
FIG. 4 is a perspective view of the floating structure, in use within an aquarium, with a turtle climbing out of the water and onto the top surface of the structure, according to the first representative embodiment of the present invention.

As shown in FIG. 4, when placed in water 30 structure 10 floats, with most of structure 10 submerged beneath the surface 32 of the water 30, but with the outer surface 35 of top side 37 floating above the surface 32 of the water 30. In the preferred embodiments, outer surface 35 is just above the surface 32 of the water 30, thereby facilitating the ability of a turtle 40 or other amphibious animal (e.g., a newt, frog or mudskipper) to climb out of the water 30 and onto the outer surface 35 of top side 37.

In addition, top side 37 may be configured in other ways to facilitate such climbing out of the water 30. For example, rounding of the edge between top side 37 and each of the sidewalls 20 and 25 (which rounding ordinarily would be provided when replicating a natural log) provides a ramp-that is particularly useful for such purpose. Also, while the end edges (e.g., front edge 41) of top side 37 are illustrated as having an abrupt drop-off in the drawings, such edges instead may be tapered so as to facilitate such climbing out of the water 30 from the front and rear ends 12 and 14, respectively, i.e., by reducing the distance from the water 30 to the outer surface 35 of top side 37 from such ends.

Preferably, outer surface 35 of top side 37 forms a substantially flat and stable platform on which turtles and other amphibious animals may rest outside of the water 30. In the preferred embodiments, this is achieved by appropriately weighting the entire structure 10, not only so that the top surface 35 remains sufficiently above the surface 32 of the water 30, and but also so that the structure 10 is stable in the depicted orientation, i.e., with the top side 37 consistently remaining the highest section when the structure 10 is floated in water 30. It is noted that structure 10 preferably has a textured surface, at least on the outer surface 35 of top side 37, and/or is otherwise configured in order to provide a fairly non-slip surface for the desired amphibious animals.

In the preferred embodiments, the desired stable floating orientation is achieved by fabricating the entire structure. 10 primarily from a buoyant material, such as foamed urethane, with a weight 44 (e.g., made of resin) embedded into or on the intended bottom side 46 of the structure 10. This can be accomplished, e.g., by forming the urethane around the weight 44 or else by simply bonding the weight 44 to the inner surface of bottom side 46. However, the former is preferred for aesthetic purposes. In any event, as a result of such bottom-weighting, the center of gravity for structure 10 is located at or very near to the bottom side 46, so the entire structure 10 is maximally biased against rolling, and the top side 37 therefore remains a stable platform.

It is noted that such bottom-weighting can be accomplished in other ways as well. For example, the entire structure 10 might be fabricated from a single type of material (e.g., having a slightly smaller mass density than water), but with a greater amount of such material provided at the bottom side 46. However, it generally is preferable to manufacture structure 10 such that the bottom side 46 has a greater overall mass density than the top side 37 (as described in the preceding paragraph) because such a configuration typically allows for a more compact structure 10 and better control over the shape of the structure 10 and its buoyancy, and also because such a configuration generally permits additional weight to be borne by the structure 10 before structure 10 becomes completely submerged.

In any event, as noted above, the buoyancy of the structure 10 itself preferably is controlled so that the top side 37 is above, but fairly close to, the surface 32 of the water 30. In this regard, two factors should be taken into account. The first, already mentioned, is that the turtles (e.g., turtle 40) or other amphibious animals to be accommodated should be able to easily climb out of the water 30 and onto the outer surface 35 of the top side 37. The other factor is the maximum amount of additional weight that top side 37 will be able to accommodate before becoming completely submerged. Generally speaking, the amount of such maximum additional weight will increase with increases in: (i) the total surface area of top side 37, (ii) the thickness of top side 37, (iii) the height of outer surface 35 above the water's surface 32 when structure 10 does not have any additional weight placed on it, and (iv) the buoyancy of the material from which top side 37 is fabricated. In the event that other constraints (e.g., size limitations and required weight-bearing capacity) require increases in factor (ii) and/or (iii) that otherwise would make it difficult for the intended amphibious animals to climb out of the water 30, as noted above, it might be possible to modify other aspects of the shape of structure 10 (e.g., the degree of curvature of the side edges and/or of the degree of taper of the top front and rear edges) to address this situation.

As shown, the outer surface 35 of top side 37 preferably is substantially flat (e.g., with only small bumps or grooves that still allow the intended animals to rest comfortably), thereby providing a good resting surface for a turtle or other amphibious animal. For this reason, at least some portion of the outer surface 35 of top side 37 preferably is substantially flat. One additional benefit of making the entire top side 37 substantially flat is that doing so generally results in the maximum surface area remaining above the surface 32 of the water 30 when any given weight is applied. However, in certain embodiments portions of the outer surface 35 are provided with larger bumps or other features, e.g., that are desirable to more closely replicate some natural object.

In one representative embodiment, the structure 10 is approximately 12 inches long and has a cross section that approximates an inverted trapezoid (with top side 37 longer than bottom side 46), but with the corners rounded, and with an outer diameter of approximately 5½ inches and an inner diameter of approximately 4½ inches, so that the average thickness of the structure is approximately ½ inch. With these dimensions, a base material of foamed urethane and a resin weight attached to the bottom side 46, the entire structure weighs just over 4 pounds, and the top side 37 can support two turtles, each having a shell size of 4 inches in diameter (e.g., up to 10 ounces in total weight), without submerging or tilting unduly. In this embodiment, the holes 16, 17, 22 and 23 each have a width (minimum dimension) of at least 1½ inches and, more preferably, 2 inches. It is noted that the inverted trapezoid shape provides increased top surface area, which provides a larger platform and also greater weight-bearing capacity, while still providing a realistic replication of the irregular shape of a naturally occurring log.

The specific embodiment described above and illustrated in the drawings pertains to a straight tunnel-shaped structure 10 having sides (or at least a top side 37) that are substantially flattened. In alternate embodiments, other tumid shapes instead may be used, e.g., using curves, turns and/or more complicated maze-like configurations.

In any event, the inner surface 49 of the bottom side 46 (e.g., formed by weight 44) preferably also is substantially flat. As a result, the structure 10 allows certain aquatic animals to rest comfortably within it (i.e., in the water) as well. Also, it is preferable to provide occasional holes or openings in the side walls of structure 10 in order to permit aquatic animals to enter and exit the tunnel 52 at different locations along tunnel 52. Moreover, the use of such dispersed openings obviates the need for openings at the front and rear ends 12 and 14, respectively, e.g., if such openings are undesirable.

It should be noted that the embodiment described above is merely representative. Other sizes instead may be used, e.g., for smaller aquariums and/or to accommodate smaller turtles. Preferably, for indoor-aquarium use the length of the structure 10 is limited to no more than 16 inches and, typically no more than 10 inches, so that the structure 10 does not take up too much of the available space in the aquarium.

The holes 16, 17, 22 and 23 in sidewalls 20 and 25 can allow appropriately sized fish, turtles and other animals to swim through and also permit the owner to observe at least some of the activity within the structure 10. For these purposes, such holes 16, 17, 22 and 23 preferably are at least ¾ inch in width and, subject to this minimum dimension, preferably are proportionate to the overall size of structure 10. In order to maintain this minimum dimension, if the overall structure 10 is significantly smaller (e.g., 6 inches in length and 3 inches in outer diameter) it generally will be preferable to include only one hole through each sidewall 20 and 25.

The interior tunnel 52 formed by the structure 10 preferably is wide enough to accommodate the desired fish and other animals, e.g., having a width of at least 1½ inches. Generally speaking, the representative dimensions will be scaled up or down depending upon the desired size of the structure 10 and, often, the type of natural object that is being replicated; however, the stated maximum and minimum dimensions preferably are maintained.

As noted above, a floating structure 10 according to the present invention often will be particularly useful in an aquarium. Ordinarily, such an aquarium will be for home use, having a capacity of not more than 300 gallons. However, in alternate embodiments such a floating structure 10 also is used in a larger container or body of water. For example, one representative use is in a koi pond. In such a case, a larger size structure 10 generally would be used, in order to accommodate large goldfish, koi carp and adult pond turtles. More preferably, such a structure 10 is large enough to enable koi and goldfish to hide inside the interior tunnel 52, thus escaping predators, and to enable adult turtles to sleep inside the interior tunnel 52 or bask in sunlight on top 35 of the structure 10.

Figure 5:
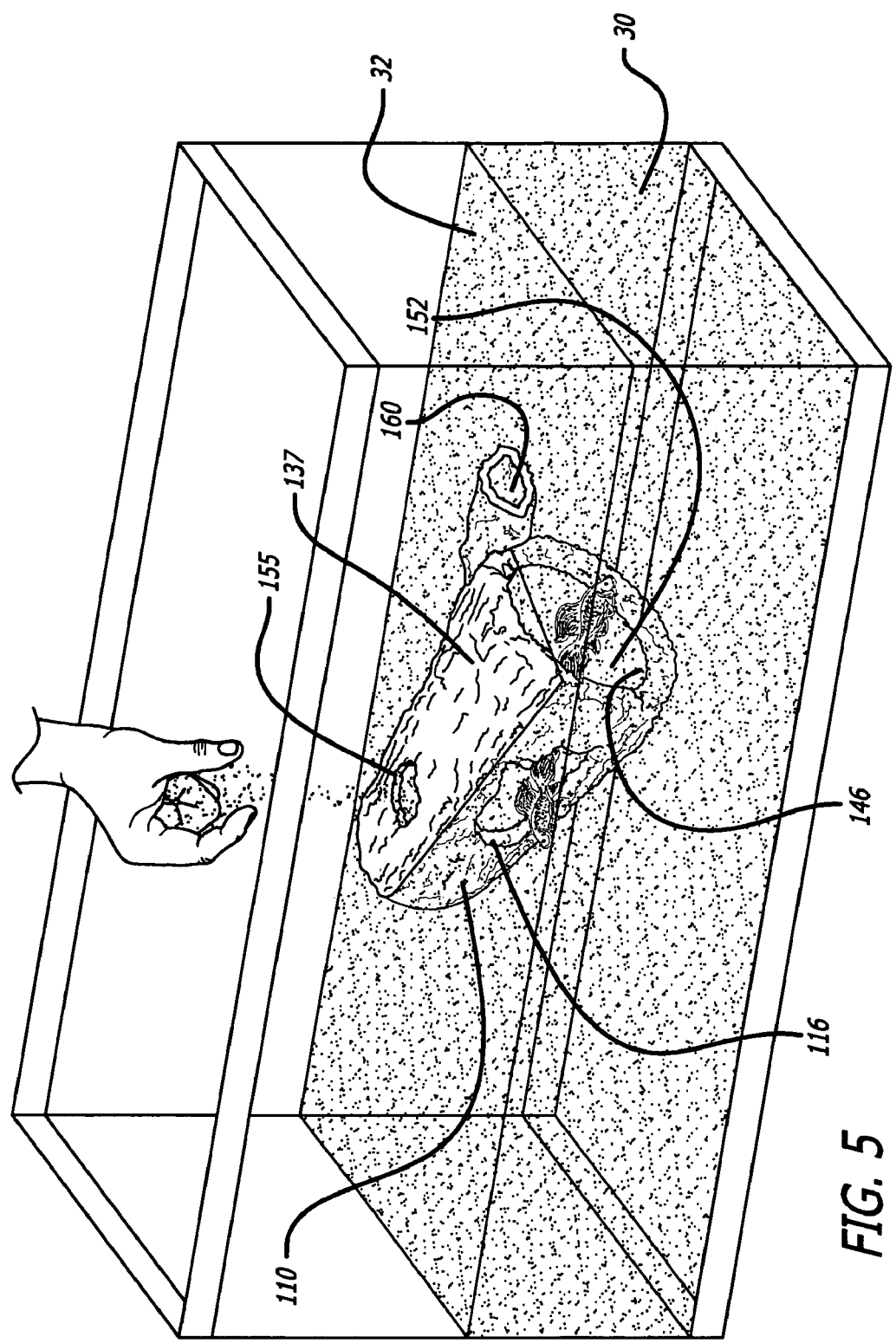
FIG. 5 is a perspective view of a floating structure, in use within an aquarium, according to a second representative embodiment of the present invention.

FIG. 5 illustrates a floating structure 110 according to a second representative embodiment of the present invention. In this embodiment, the top side 137 is provided with a hole 155 that extends through the entire thickness of the top side 137 and into the interior tunnel 152. Preferably, hole 155 is at least ¾ inch in width, but may be scaled to an even larger size for larger versions of structure 110. The owner can use hole 155, e.g., for feeding the fish and other aquatic animals that enter structure 110. As a result, any food that is deposited into hole 155 that ends up sinking will not sink all the way to the bottom of the aquarium (or other container or body of water) where it often otherwise would be inaccessible, but instead will be caught by the bottom side 146 of the structure 110 where it can be easily retrieved by the animals it was intended to feed. In addition, by capturing the food in an enclosed container, the food generally will not pollute the rest of the aquarium, but instead will tend to remain there until eaten by the intended aquatic animals.

As shown, structure 110 also includes a secondary tunnel 160 which, in the present embodiment, is an offshoot of the interior tunnel 152. Thus, if structure 110 is configured to replicate a hollowed-out log, then secondary tunnel 160 replicates a portion of a branch extending from the main trunk of the log. In the present embodiment, secondary tunnel 160 provides a passageway into the main interior tunnel 152. However, in alternate embodiments secondary tunnel 160 is closed off at either of its ends.

As indicated, secondary tunnel 160 has a width that is substantially smaller than the width of the interior tunnel 152, thereby allowing smaller animals to use, 160 in the same manner that larger animals use tunnel 152. For example, in the present embodiment interior tunnel 152 has a width of approximately 2 inches while secondary tunnel 160 has a width of approximately ⅜ inch.

Each of left sidewall 120 and right sidewall 125 has only a single hole (e.g., hole 116), due to the small size of structure 110. However, the single hole in each sidewall 120 and 125 is elongated, having an oval shape which maintains the minimum dimension of ¾ inch (approximately 1¾ inch, in this case) e.g., but having a maximum dimension in this case of nearly 2 inches. It is noted that in certain embodiments of the invention, the holes in sidewalls 120 and 125 (or holes 16, 17, 22 and 23) primarily are used as a viewing portals.

In the embodiment shown in FIG. 5, the structure 110 also has been manufactured so as to replicate a hollowed-out log. However, in this embodiment the shape is even more cylindrical, having a substantially circular cross-section. That feature and the presence of hole 155 makes the structure 110 shown in FIG. 5 more suitable for applications in which the owner does not expect amphibious animals to climb out of the water and onto the top side 137 of the structure 110, but instead, e.g., is intending the structure 110 for use in an aquarium or other setting where only fish are present.

However, it should be understood that hole 155 may be provided in a structure that has a substantially flat top side, as in structure 10 described above, e.g., for feeding purposes. More generally, any of the features from structure 10 discussed above may be incorporated into structure 110, and vice versa. Similarly, any of the uses of and considerations pertaining to structure 10 also apply to structure 110, and vice versa.

In the embodiments discussed above, the structures 10 and 110 are entirely opaque other than any holes that may be provided in them. As a result, the fish and other aquatic animals often will view the corresponding structure 10 or 110 as a resting or hiding place. However, in alternate embodiments of the invention, structure 10 and/or structure 110 is partly or entirely transparent or translucent.

A structure 10 or 110 (for convenience, referred to in the following discussion as log 10) may be fabricated, e.g., using an injection-molding process. One example of such a fabrication technique is as follows. Log 10 is assembled from two halves, e.g., defined by a lateral slice of log 10 to create a top half (including top side 37 and the top half of sidewalls 20 and 25) and a bottom half (including bottom side 46 and the bottom half of sidewalls 20 and 25).

The mold assembly for each half of log 10 consists of two halves that fit together, each composed of a hard, rigid plaster-like portion and a flexible portion. The flexible portion is placed inside the rigid portion, and then the flexible portion is coated with a thin layer of resin using a putty knife. This provides a hard, water-resistant outer layer for the log 10. The mold assembly for the bottom half of the log 10 is provided with a thicker layer of resin, preferably concentrated at the bottom side 46 (and, more preferably, at the bottom of bottom side 46), in order to provide the desired bottom-weight.

Next, for each mold assembly, the two parts of the mold are assembled, 2-part urethane foam is injected into the mold, and the mold is placed into a press while the foam urethane expands within the hard resin shell. The mold assembly is then removed from the press and disassembled. The corresponding half of log 10 is then peeled away from the flexible portion of the mold. After deburring, the two halves of log 10 are "glued" together with resin, the log 10 is tested for buoyancy, and then paint is applied.

As result, the finished log 10 has hard surfaces, in the same manner as a natural log. However, most of the interior space of log 10 (e.g., between the wall of tunnel 52 and the outer surface of log 10) is a buoyant material, allowing log 10 to float. In addition, because additional resin (which has a mass density which is greater than that of water) is provided at the bottom side 46, the desired stable floating position is achieved.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A floating structure for use in an aquarium comprising:
a hollow substantially cylindrical shaped elongated body having a substantially flat top side, a bottom side, and sidewalls between the top side and the bottom side defining a tunnel extending through the elongated body, the elongated body also including an open first end and an open second end allowing a fish to swim through the tunnel defined by the elongated body;
wherein the hollow substantially cylindrical shaped elongated body is composed of a buoyant material and a weight is embedded in or attached to the bottom side of the elongated body so that a center of gravity for the structure is located at or near the bottom side of the elongated body, so the structure is biased against rolling and the top side remains at least partially above a surface of water when unsupported by surfaces of the aquarium.

2. The floating structure as claimed in claim 1, further comprising at least one opening on the side walls.

3. The floating structure as claimed in claim 1, wherein the buoyant material is a resin, a urethane or a foamed urethane.

4. The floating structure as claimed in claim 1, wherein an inner surface of the bottom side is substantially flat and the weight is secured thereto.

5. The floating structure as claimed in claim 1, wherein the structure is comprised of a material having a mass density less than a density of water.

6. The floating structure as claimed in claim 1, wherein a mass density of the bottom side is greater than a mass density of the top side.

7. The floating structure as claimed in claim 1, further comprising a second hollow substantially cylindrical shaped elongated body attached to at least one side of the side walls.

8. A floating structure for us in an aquarium comprising:
a hollow substantially cylindrical shaped elongated body having a substantially flat top side, a bottom side, and sidewalls between the top side and the bottom side defining a tunnel extending through the elongated body, the elongated body also including an open first end and an open second end allowing a fish to swim through the tunnel defined by the elongated body;
wherein the hollow substantially cylindrical shaped elongated body is composed of a buoyant material and a weight is embedded in or attached to the bottom side of the elongated body so that a center of gravity for the structure is located at or near the bottom side, so the structure is biased against rolling and the top side remains at least partially above a surface of water when unsupported by surfaces of the aquarium;
wherein the buoyant material is a resin, a urethane or a foamed urethane; and
wherein the structure is comprised of a material having a mass density less than a density of water.

* * * * *

UNITED STATES PATENT AND TRADEMARK OFFICE
CERTIFICATE OF CORRECTION

| | | |
|---|---|---|
| PATENT NO. | : 7,918,187 B2 | Page 1 of 1 |
| APPLICATION NO. | : 12/656081 | |
| DATED | : April 5, 2011 | |
| INVENTOR(S) | : Gary Wayne Bagnall | |

It is certified that error appears in the above-identified patent and that said Letters Patent is hereby corrected as shown below:

Column 4, line 20, the word "tumid" should read --tunnel--.

Column 8, line 10, cancel the text beginning with "8. A floating structure" to and ending "density of water", and insert the following claim:

--8. A floating structure for use in an aquarium comprising:
a hollow substantially cylindrical shaped elongated body having a substantially flat top side, a bottom side, and sidewalls between the top side and the bottom side defining a tunnel extending through the elongated body, the elongated body also including an open first end and an open second end allowing a fish to swim through the tunnel defined by the elongated body;
wherein the hollow substantially cylindrical shaped elongated body is composed of a buoyant material and a weight is embedded in or attached to the bottom side of the elongated body so that a center of gravity for the structure is located at or near the bottom side, so the structure is biased against rolling and the top side remains at least partially above a surface of water when unsupported by surfaces of the aquarium;
wherein the buoyant material is a resin, a urethane or a foamed urethane; and
wherein the structure is comprised of a material having a mass density less than a density of water.--.

Signed and Sealed this
Twelfth Day of July, 2011

David J. Kappos
*Director of the United States Patent and Trademark Office*